United States Patent
Li et al.

(10) Patent No.: US 10,219,167 B2
(45) Date of Patent: Feb. 26, 2019

(54) ANTENNA ARRAY UPLINK SECTOR LEVEL SWEEP TO ALLOW COEXISTENCE WITH OTHER IN-DEVICE RADIOS

(71) Applicant: Apple Inc., Cupertino, CA (US)

(72) Inventors: Qiuming Li, Santa Clara, CA (US); Nicholas M. McDonnell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 15/272,185

(22) Filed: Sep. 21, 2016

(65) Prior Publication Data
US 2018/0084438 A1    Mar. 22, 2018

(51) Int. Cl.
H04B 7/08       (2006.01)
H04W 16/28      (2009.01)
H04B 17/318     (2015.01)

(52) U.S. Cl.
CPC ............ *H04W 16/28* (2013.01); *H04B 7/088* (2013.01); *H04B 17/318* (2015.01)

(58) Field of Classification Search
CPC ...... H04B 17/318; H04B 7/063; H04W 16/28
See application file for complete search history.

(56) References Cited

U.S. PATENT DOCUMENTS

| | | | |
|---|---|---|---|
| 6,757,553 B1 | 6/2004 | English | |
| 8,184,052 B1* | 5/2012 | Wu | H01Q 3/2605 342/368 |
| 8,335,167 B1* | 12/2012 | Zhang | H04B 7/0626 370/252 |
| 8,886,139 B2 | 11/2014 | Zhang et al. | |
| 2011/0064033 A1* | 3/2011 | Gong | H04B 7/0617 370/329 |
| 2014/0218236 A1* | 8/2014 | Sadeghi | H04W 16/28 342/367 |
| 2015/0189686 A1* | 7/2015 | Kasher | H04W 76/18 455/41.2 |
| 2016/0149633 A1 | 5/2016 | Sanderovich et al. | |
| 2016/0227368 A1 | 8/2016 | Sanderovich et al. | |
| 2016/0249269 A1* | 8/2016 | Niu | H04W 56/0095 |
| 2016/0255660 A1* | 9/2016 | Son | H04B 7/0491 370/329 |
| 2018/0077547 A1* | 3/2018 | Sanchez Barajas | H04B 7/04 |

FOREIGN PATENT DOCUMENTS

WO    2016085577 A1    6/2016

* cited by examiner

*Primary Examiner* — Kashif Siddiqui
(74) *Attorney, Agent, or Firm* — Fletcher Yoder, P.C.

(57) ABSTRACT

A method for operating a first radio of a number of radios within a radio frequency system may include sending a first command to the first radio of the plurality of radios to initiate an antenna sector level sweep and determining a first set of metrics associated with a first set of signals from other radios of the plurality of radios that correspond to the antenna sector level sweep. The method may also include receiving a second set of metrics associated with the first set of signals from a responder electronic device and identifying a sector of a number of sectors associated with the antenna sector level sweep based on the first set of metrics and the second set of metrics. The method may then involve sending a second command to the first radio to transmit data to the responder device via the identified sector.

21 Claims, 6 Drawing Sheets

ANTENNA ARRAY UPLINK SECTOR LEVEL SWEEP TO ALLOW COEXISTENCE WITH OTHER IN-DEVICE RADIOS

CROSS REFERENCE TO RELATED APPLICATIONS

This application is related to U.S. patent application Ser. No. 15/272,196, entitled "ANTENNA ARRAY UPLINK SECTOR SELECTION AND DE-SELECTION BASED ON COEXISTENCE WITH OTHER IN-DEVICE RADIOS", filed Sep. 21, 2016, which is herein incorporated by reference.

BACKGROUND

The present disclosure relates generally to radio frequency systems and, more particularly, to controlling an operation of a radio frequency system to mitigate interference by one radio with co-existing radios.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often include a radio frequency system to facilitate wireless communication of data with another electronic device and/or a network. To facilitate wireless communication, the radio frequency system may include multiple radios that communicate with other electronic devices, wireless access points, cellular base stations, and the like. Since each radio within the radio frequency system communicates via various frequency bands, antenna sectors, and other communication parameters, the operation of each radio within the radio frequency may affect the operation of other radios.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to radio frequency systems used to facilitate wirelessly communicating data. In certain electronic devices, multiple radios operate within a radio frequency system to transmit and receive data to and from other electronic devices, networks, and the like. Oftentimes, when multiple radios of the radio frequency system are active (e.g., transmitting or receiving), signals being transmitted from some of the radios may interfere with signals being received via other radios. In some cases, the interference from some radios may inhibit the abilities of other radios from effectively transmitting or receiving accurate data packets.

With this in mind, in some embodiments, a processor of an electronic device may cause a radio to perform an antenna sector level sweep using one radio in the radio frequency system of an electronic device, while different combinations of other radios in the radio frequency system are also active. The processor may generate and store certain metrics related to the quality of the data transmission, data reception, or signal via each sector.

The processor may then identify a sector to establish a communication link with another electronic device (e.g., responder device) based on metrics related to receive signal quality metrics of other co-existing radios and metrics related to receive signal quality of the responder electronic device via an antenna sector level sweep. That is, a processor (e.g., initiator) may determine which antenna sector to use for the transmission of data based on a signal quality of other active radios for each sector of an antenna sector level sweep and a signal quality for each sector of an antenna sector level sweep as determined by the responder electronic device designated to receive the transmitted data from the initiator device. By evaluating the signal quality from the perspectives of the co-existing device and the responder device, the processor may use the antenna sector that may provide a relatively higher quality of data transmission, as compared to the other available sectors with lower interference of other radios. Moreover, the processor may employ this adaptive process when establishing a communication link with different electronic devices to continuously use a sector of the transmitting antenna that transmits data more efficiently than the other sectors of the antenna, according the relevant properties regarding the communication between the transmitting device and each respective receiving device.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logic OR) and not exclusive (e.g., logic XOR). In other words, the phase A "or" B is intended to mean A, B, or both A and B.

The present disclosure relates to radio frequency systems used to facilitate wirelessly communicating data between an electronic device and another electronic device and/or a network. For example, a radio frequency system may wirelessly communicate data by transmitting radio waves modulated in manner representative of the data, for example, via a personal area network (e.g., Bluetooth network), a local area network (e.g., an 802.11x Wi-Fi network), and/or a wide area network (e.g., a 4G, 5G, or LTE cellular network). In other words, radio frequency systems may utilize various wireless communication protocols to facilitate wireless communication of data.

Regardless of the wireless communication protocol, operation of radio frequency systems may be generally similar. For example, generally, processing circuitry may generate a digital representation of the data to be transmitted as a digital electrical signal and a transceiver (e.g., a transmitter and/or a receiver) may convert the digital electrical signal into an analog electrical signal. When transmitting the data, the radio frequency system may perform an antenna sector level sweep to identify one or more sectors of a respective antenna to use to transmit the data. In one embodiment, prior to transmitting data, the radio frequency system may adaptively identify a sector to use to communicate with another electronic device (e.g., responder device) based on metrics regarding a signal being received by the responder device and based on metrics regarding the receive signal quality of other co-existing radios within the radio frequency system. For instance, in one embodiment, the radio frequency system may determine metrics associated with a signal transmitted to the responder device for each sector of a sector level sweep. The radio frequency system may then receive feedback or information from the responder device that indicates metrics related to each sector of the sector level sweep regarding the received signals.

The radio frequency system may also determine metrics regarding the receive signal quality of other co-existing radios. In this way, the radio frequency system may determine which sector to use to establish a communication link with the responder device based on signal strength or quality information from both the responder device and the other co-existing radios of the radio frequency system to provide an efficient transmission of data with minimum interference of other co-existing radios.

Figure 1:
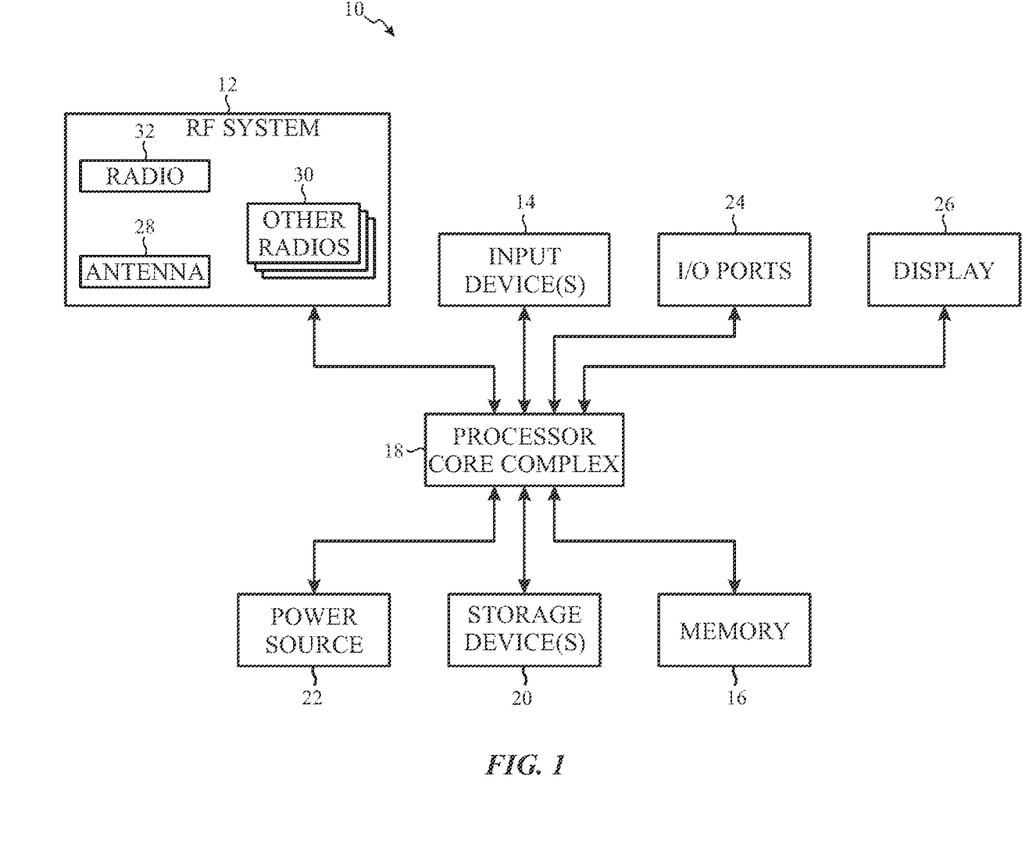
FIG. 1 is a block diagram of an electronic device with a radio frequency system, in accordance with an embodiment.

To help illustrate, one embodiment of an electronic device 10 including a radio frequency system 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the radio frequency system 12, one or more input devices 14, local memory 16, a processor core complex 18, one or more main memory storage devices 20, a power source 22, one or more input/output ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and a main memory storage device 20 may be included in a single component.

As depicted, the processor core complex 18 is operably coupled with local memory 16 and the main memory storage device 20. Thus, the processor core complex 18 may execute instruction stored in local memory 16 and/or the main memory storage device 20 to perform operations, such as instructing the radio frequency system 12 to communicate with another electronic device and/or a network. As such, the processor core complex 18 may include one or more general-purpose microprocessors, one or more application specific processors (ASICs), one or more field programmable logic arrays (FPGAs), or any combination thereof.

In addition to the instructions, the local memory 16 and/or the main memory storage device 20 may store data to be processed by the processor core complex 18. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable non-volatile memory such as flash memory, hard drives, optical discs, and the like.

As depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Additionally, as depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Furthermore, as depicted, processor core complex 18 is operably coupled with the input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As depicted, the processor core complex 18 is also operably coupled with the radio frequency system 12. As described above, the radio frequency system 12 may facilitate wirelessly communicating data with another electronic device and/or a network. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a 4G, 5G, or LTE cellular network. In other words, the radio frequency system 12 may enable wirelessly communicating data using various communication protocols and/or at various output powers (e.g., strength of transmitted analog electrical signals).

In some embodiments, the radio frequency system 12 may include one or more antennas 28, and at least one of the antennas 28 may have a number of antenna sectors, which contain at least one or more antenna elements. The radio frequency system 12 thus may transmit and/or receive signals via the one or more antennas 28 using one or more antenna sectors. In addition, the radio frequency system 12 may include a number of radios 30, 32 that may communicate with one or more other electronic devices via the antenna 28. Each radio 30, 32 may include hardware and/or software that enables the respective radio 30, 32 to communicate via a particular protocol, with a particular type of electronic device, via a particular type of mobile data processing station, or the like. In one embodiment, the radio frequency system 12 may include a millimeter-wave (MMW) radio (e.g., radio 32). Millimeter wave communications, which are sometimes referred to as extremely high frequency (EHF) communications, involve communications at frequencies of about 10-400 GHz. Operation at these frequencies may support high bandwidths. In addition, the radio frequency system 12 may include other radios 30 that are capable of communicating with Wi-Fi devices, global positioning system (GPS) devices, cellular devices, Bluetooth® devices, and the like.

Even when using different communication protocols, operational principles of radio frequency systems 12 may be generally similar. For example, as will be described in more detail below, the radio frequency system 12 may use a transceiver to convert a digital electrical signal, which digitally represents data to be transmitted, into an analog electrical signal, thereby generating an analog representation of the data. Additionally, the radio frequency system 12 may use an amplifier device to amplify the analog electrical signal to a target output power, thereby generating an amplified analog electrical signal. Based at least in part on the amplified analog electrical signal, the radio frequency system 12 may output modulated radio waves to wirelessly communicate the data to another electronic device and/or a network. Due to similarities in operational principles, the techniques described herein may be applicable to any suitable radio frequency system 12 regardless of communication protocol.

Figure 2:
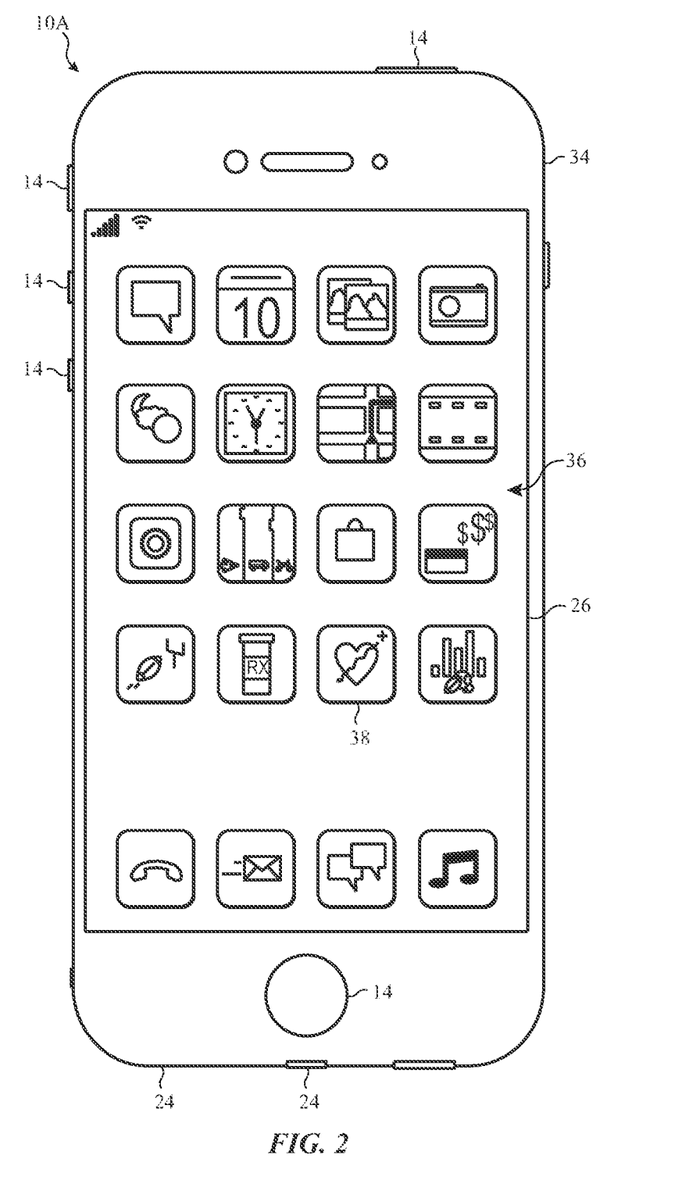
FIG. 2 is a front view of a hand-held device representing an example of the electronic device of FIG. 1, in accordance with an embodiment.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the antenna 28 of the radio frequency system 12.

Additionally, as depicted, the enclosure 34 may surround the electronic display 26. In the depicted embodiment, the electronic display 26 is displaying a graphical user interface (GUI) 36 having an array of icons 38. By way of example, when an icon 38 is selected either by an input device 14 or a touch-sensing component of the electronic display 26, an application program may launch.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, a multi-function connector port (e.g., Lightning port) to connect to external devices.

Figure 3:
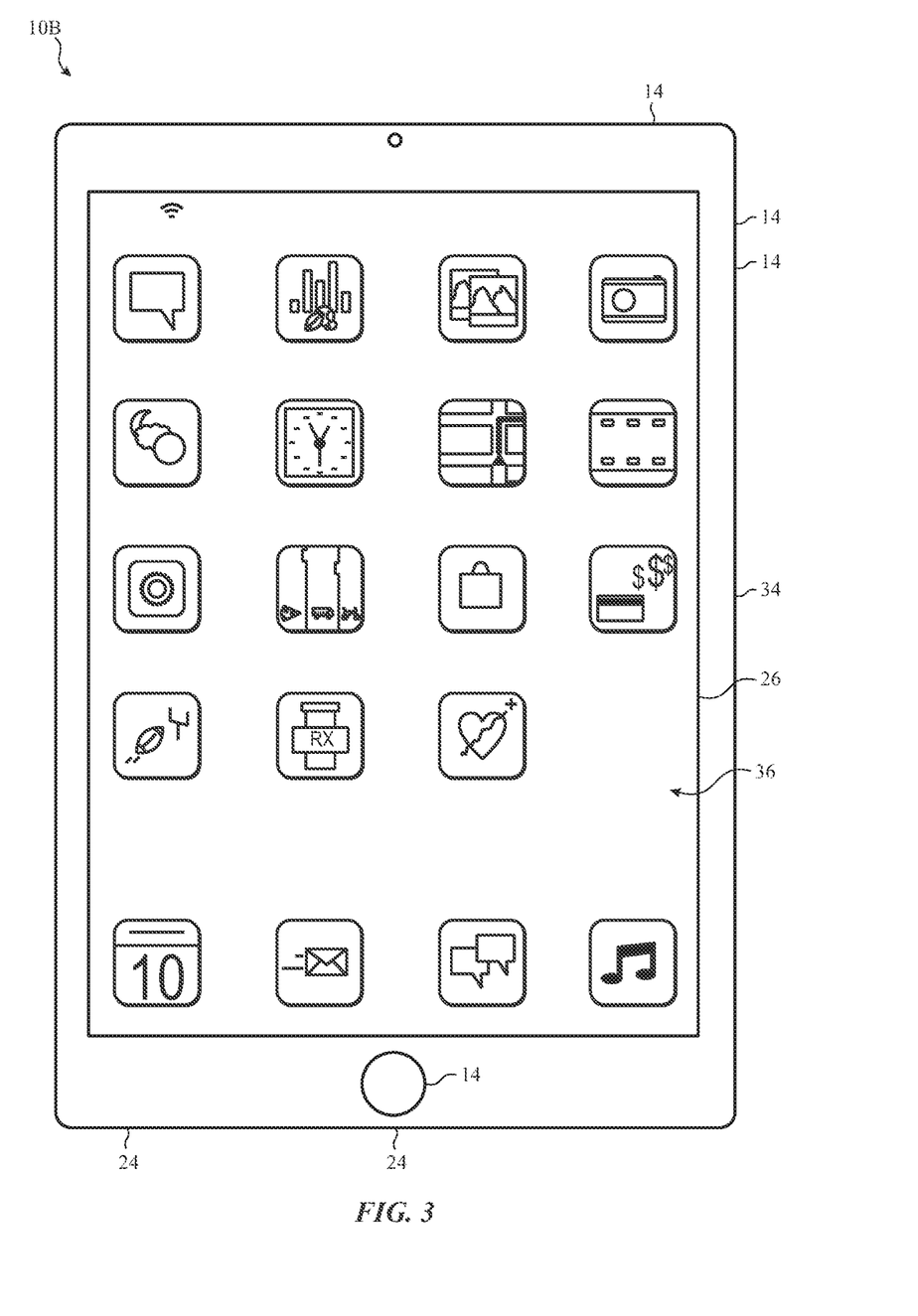
FIG. 3 is a front view of another hand-held device representing another example of the electronic device of FIG. 1, in accordance with an embodiment.
Figure 4:
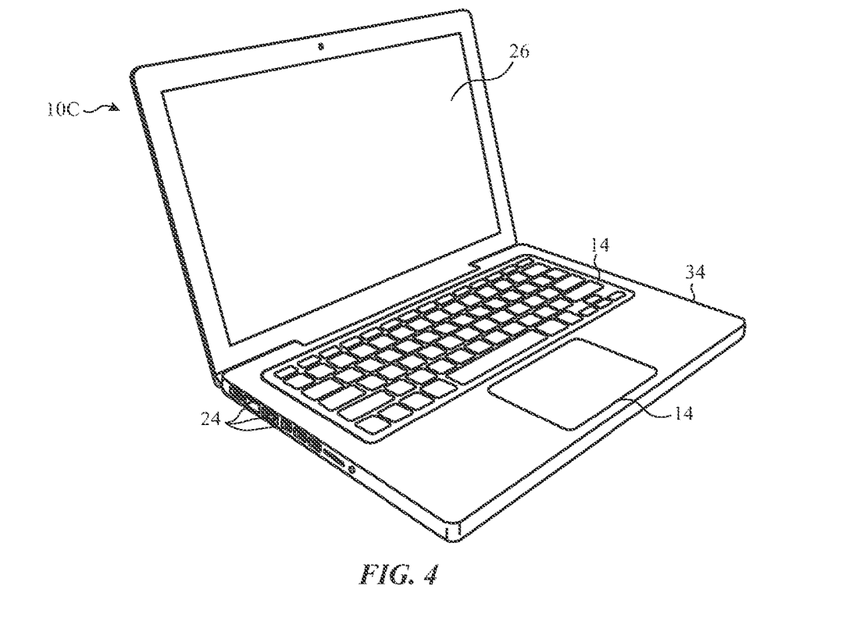
FIG. 4 is a perspective view of a notebook computer representing another example of the electronic device of FIG. 1, in accordance with an embodiment.
Figure 5:
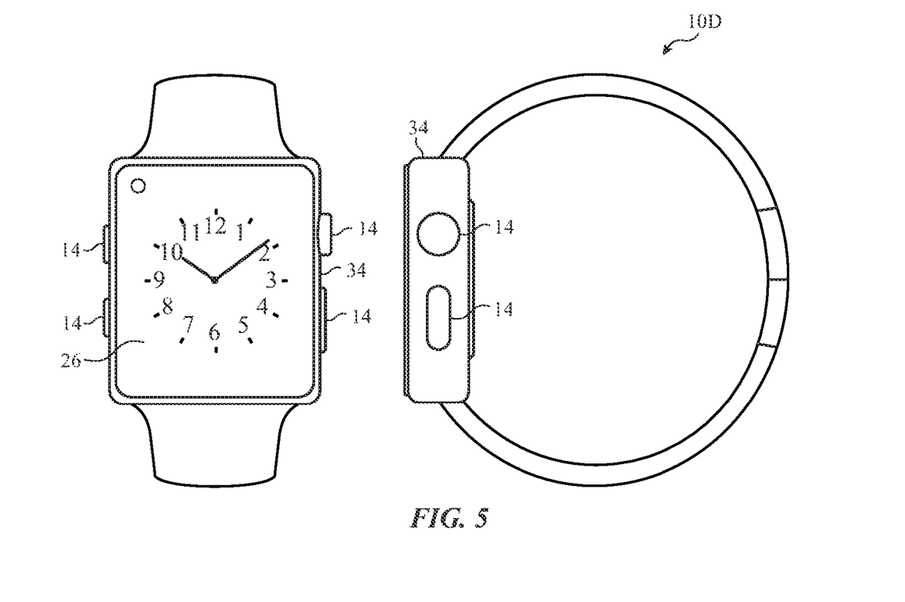
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose a radio frequency system 12 in the tablet electronic device 10B, the computer 10C, and/or the watch 10D. As described above, a radio frequency system 12 may facilitate wirelessly communicating data with other electronic devices and/or a network.

As discussed above, the radio frequency system 12 may include a number of different radios 30, 32 that may communicate with a variety of electronic devices via a variety of different communication protocols. When different combinations of radios are active or communicating at the same time, the signals being transmitted or received via the radio 32 may interfere with the signals being transmitted or received via the other radios 30 in the radio frequency system 12. As such, the presently disclosed systems and techniques are related to mitigating the interference of a signal being transmitted or received via the other radios (e.g., radios 30) due to the signals being transmitted or received via the first radio 32.

Figure 6:
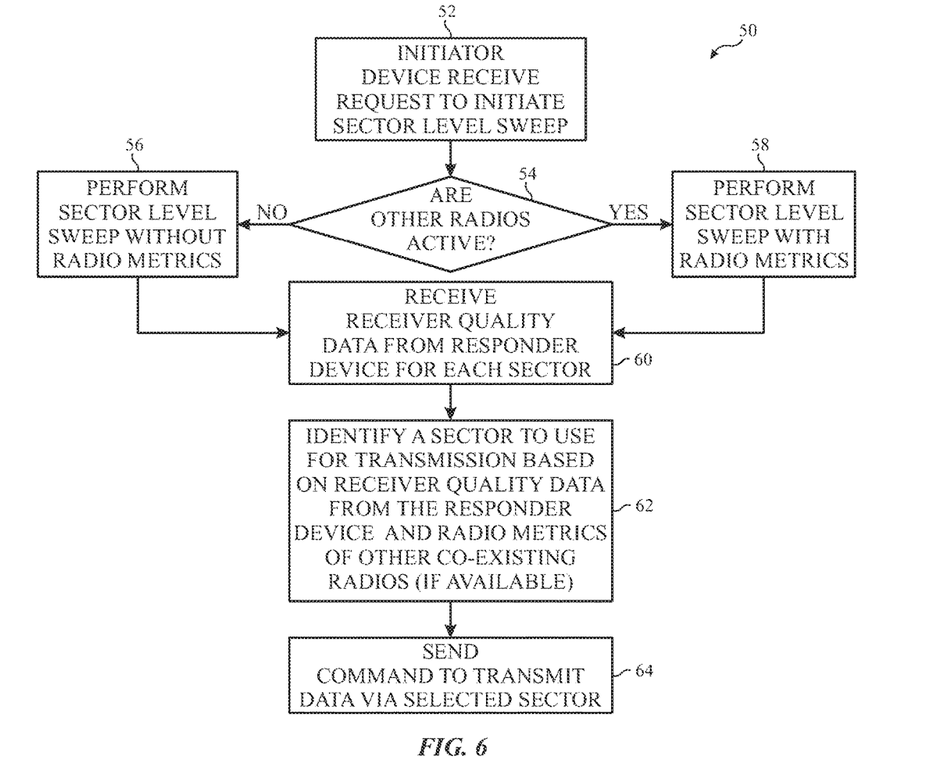
FIG. 6 is a flow chart of a method for communicating via selected antenna sectors of a radio based on radio metrics associated with other co-existing radios and receive signal quality, as determined by the responder device, in accordance with an embodiment.

With the foregoing in mind, FIG. 6 illustrates a flow chart of a method 50 for adaptively selecting an antenna sector for establishing a communication link with another electronic device based on signal properties associated with the responder device and signal properties received by other radios. Although the following description of the method 50 will be described as being performed by the processor core complex 18, it should be noted that any suitable processing-type device may perform the method 50. Also, it should be understood that the method 50 may not be limited to being performed according to the order depicted in FIG. 6; and instead may be performed in any suitable order.

Referring now to FIG. 6, at block 52, the processor core complex 18 of an initiator device may receive a request to initiate a sector level sweep for the radio 32. In some embodiments, the request may be associated with the transmittal of data via the radio 32. At block 54, the processor core complex 18 may determine whether other radios 30 are active prior to sending a command to the radio 32 to perform the sector level sweep.

If, at block 54, the processor core complex 18 determines that no other radios 30 are active, the processor core complex 18 may proceed to block 56 and send a command to the radio 32 to perform the sector level sweep without obtaining metrics related to the quality of other radios 30. If, however, at block 56, the processor core complex 18 determines that one or more other radios 30 are active, the processor core complex 18 may proceed to block 58.

At block 58, the processor core complex 18 may send a command to the radio 32 to perform a sector level sweep and obtain metrics related to the signal quality of the other radios 30. The metrics related to the transmitted signal may include any suitable measurement that indicates a strength or quality of a signal received by the other radios 30. The signal quality may be measured or determined using a variety of techniques, such as a received signal bit error rate, a signal-to-noise ratio (SNR), a noise floor level, and the like. The metrics may also quantify a downlink quality of the signals received via the radio 32. It should be noted that the metrics may also include other receiver signal quality metrics such as Received Signal Strength Indicator (RSSI), Reference Signal Received Power (RSRP), Reference Signal Received Quality (RSRQ), Received Signal Code Power (RSCP), Receiver Automatic Gain Control (Rx AGC), Traffic Channel Receive Level (TCH Rx Level), and the like.

Figure 7:
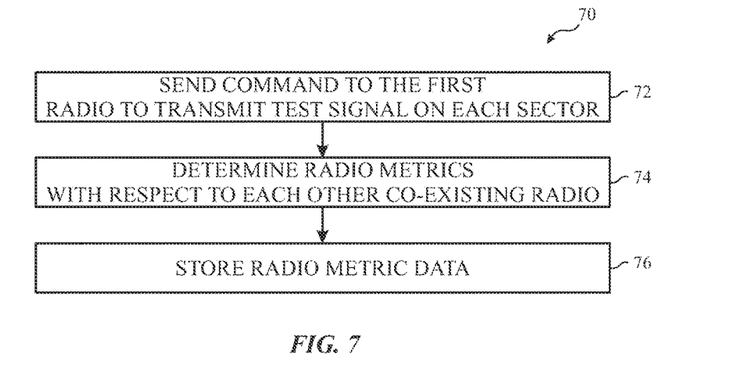
FIG. 7 is a flow chart of a method for determining metrics related to signal strength or signal quality of other radios in the electronic device of FIG. 1 while accounting for the transmission of a particular radio in the electronic device, in accordance with an embodiment.

FIG. 7 illustrates an example flow chart of a method 70 for determining metrics when performing the sector level sweep, as discussed above with regard to block 58. As shown in FIG. 7, at block 72, the processor core complex 18 may send a command to the radio 32 to transmit a test signal via each antenna sector, channel, or sub-channel of the antenna 28. After transmitting the test signals, at block 74, the processor core complex 18 may determine certain metrics related to the strength or quality of each other radio 30 that may be active for each respective sector, channel, or sub-channel with respect to each other radio 30 that may be active. The metrics may be determined based on signals received by the other radios 30 in the radio frequency system 12 of the initiator device. That is, the interference caused by the test signals being transmitted via each respective sector, channel, or sub-channel at block 72 by the first radio 32 may related to receiver quality information regarding the operation of the other radios 30. As such, at block 74, the processor core complex 18 may determine the metrics that measure the signal strength or signal quality as received by other radios 30 with respect to the interference caused by the radio 32. In some embodiments, the metrics may include a victim Received Signal Strength Indicator (RSSI) value that may correspond to a measurement of signal quality or signal strength of the signal received by the other radios 30 in response to the test signal transmitted at block 72. After determining the receive quality metrics of the other radios 30 that are active, the processor core complex 18 may, at block 76, store the information in a local memory or the like to use for future analysis, as will be detailed below.

Referring back to FIG. 6, after the radio 32 performs the sector level sweep with (block 58) or without (block 56) determining corresponding metrics, the processor core complex 18 may proceed to block 60. At block 60, the processor core complex 18 may receive receiver quality data from the responder device for each respective sector, channel, or sub-channel. That is, when the radio 32 performs the sector level sweep at block 58, the responder device may determine certain metrics (e.g., RSSI) related to the strength or quality of the test signal that the responder device received for each respective sector, channel, or sub-channel. The responder device may send the receiver quality data in an array that includes metric values for each respective sector, channel, or sub-channel. The array may thus provide quantified information related to the quality of the signal received from the radio 32 during the sector level sweep.

At block 62, the processor core complex 18 may identify a sector for the radio 32 to use to transmit data to the responder device based on the receiver quality data from the responder device and the radio metrics associated with the other radios 30, if available. That is, if the processor core complex 18 determined that no other radios 30 were active at block 54, the processor core complex 18 may not have metrics associated with the radio 32 to use to identify the appropriate sector, channel, or sub-channel to use in a subsequent communication.

Alternatively, if the processor core complex 18 did perform the sector level sweep and determine the relevant radio metrics at block 58, the processor core complex 18 may use both the metrics associated with the other radios 30 (e.g., block 76) and the receiver quality data (e.g., block 96) of the responder device to identify a suitable sector, channel, or sub-channel to use for a subsequent communication between the radio 32 and the responder device (e.g., block 98).

In one embodiment, the processor core complex 18 may identify the appropriate sector, channel, or sub-channel to use by determining which sector, channel, or sub-channel was the least aggressor to impact the other radios 30 and which sector, channel, or sub-channel was associated with the highest receive signal strength from the perspective of the responder device. For instance, the metrics related to the radio 32 determined at block 58 may and the receiver quality data may indicate RSSI values for each sector.

By way of example, RSSI values of the other active radios 30 associated with the transmission of the test signal by the radio 32 may be −100, −100, −100, −100, −80 (dBm) for sectors 1-5, respectively, and the RSSI values for the five sectors associated with the reception of the test signal by the responder device may be −100, −96, −96, −60, −65 (dBm) for sectors 1-5, respectively. Based on the example datasets provided above, at block 62, the processor core complex 18 may identify the sector that has the highest combined relative RSSI value. As such, the combined RSSI values for the received signal by both the other radios 30 and the responder radio may be −200, −196, −196, −160, −165 (dBm) for sectors 1-5, respectively. The processor core complex 18 may thus identify sector 4 as the sector to use for transmission because sector 4 has the highest relative signal strength, as compared to the other sectors. Although the example provided above was described with respect to sectors, it should be noted that the same determination process described above for block 62 may also be performed with regard to a channel or a sub-channel of a respective sectors. In addition, although the example provided above employed an algorithm that summed the RSSI values of the other radios 30 and the responder device, it should be noted that a number of other algorithms for identifying a viable communication sector may be employed. The decision for choosing the antenna sector to use for communication may be made based on the highest relative receive quality of the responder device with acceptable receive degradation of other co-existing radios (e.g., other radios 30) in the initiator device.

After identifying the sector to use for transmission, at block 64, the processor core complex 18 may send a command to the radio 32 to transmit data via the identified sector, channel, or sub-channel. Accordingly, the radio 32 may transmit data via the sector, channel, or sub-channel that provides the least relative impact to signal quality in light of the other radios 30 that may be active, the ambient conditions in the environment where the transmission is occurring, and the internal electric and/or magnetic interference that may be caused by other components within the electronic device 10.

Figure 8:
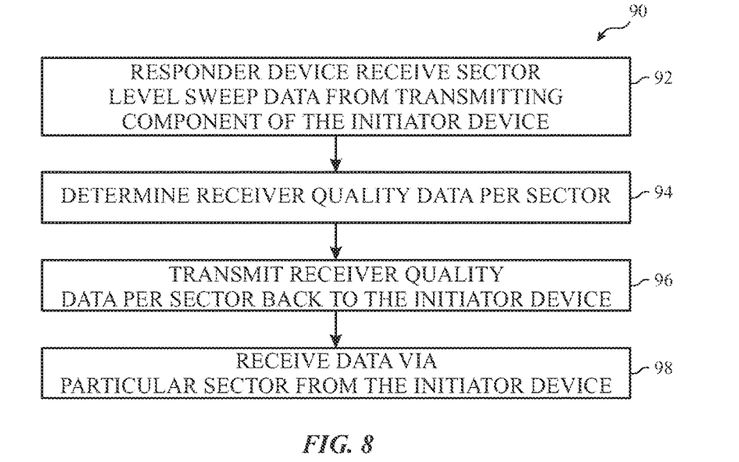
FIG. 8 is a flow chart of a method for determining receiver quality of the responder electronic device related to the transmitted data from the initiator device, in accordance with an embodiment.

With the foregoing in mind, FIG. 8 illustrates a method 90 that provides a counterpart process to the method 50 of FIG. 6 with regard to the operation of the responder device. The responder device may include any suitable electronic device or communication station that is capable of receiving and transmitting signals to the radios 30, 32. For instance, the responder device may include WiGig access point, a cellular base station 116, a similar type of electronic device 10, and the like. The following description of the method 90 should be read in light of the method 50 described above. That is, as the method 50 is described from the perspective of the processor core complex 18 of the initiator electronic device 10, the method 90 is described from the perspective of a processor associated with the responder device when the processor core complex 18 is performing the method 50.

Referring now to FIG. 8, at block 92, the processor of the responder device may receive sector level sweep data from the initiator electronic device 10 via the radio 32. As such, the processor may receive a test signal via a number of sectors, channels, or sub-channels.

At block 94, the processor may determine the receiver quality data for each sector, channel, or sub-channel for the test signals received via each sector, channel, or sub-channel from the radio 32. As discussed above, the receiver quality data may include metrics related to the strength or quality of each test signal received via each sector, channel, or sub-channel. In one embodiment, the processor may organize the metric data in an array or some other data structure (e.g., table) to indicate the corresponding metric value for each sector, channel, or sub-channel.

After determining the receiver quality data, the processor of the responder device may proceed to block 96 and transmit the receiver quality data back to the initiator device (e.g., electronic device 10). The processor core complex 18 may use the receiver quality data of the responder device to identify a sector, channel, or sub-channel to use in a subsequent communication.

At block 98, the processor of the responder device may receive data from the radio 32 via the selected sector, channel, or sub-channel. The selected channel may provide the highest relative signal strength or quality while accounting for the transmission quality of the radio 32 and the reception quality as received by the responder device.

Figure 9:
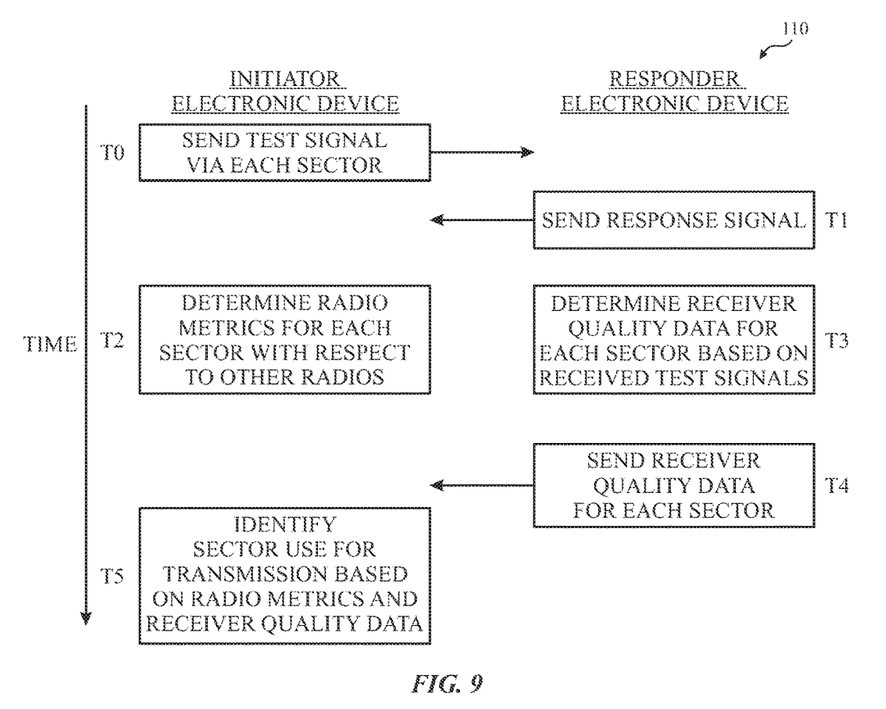
FIG. 9 is a swim lane diagram that illustrates the operations of the electronic device of FIG. 1 and a corresponding responder device when performing the methods of FIGS. 6, 7, and 8, in accordance with an embodiment.

Keeping the foregoing in mind, FIG. 9 illustrates a swim lane diagram 110 that depicts some of the operations performed by the radio 32 of the initiator device and the responder device, as described above with regard to the method 50 and the method 90, with respect to time. It should be noted that although the swim lane diagram 110 depicts certain events occurring at certain times, the depicted events are not limited to the order presented. Instead, each event may occur in various suitable orders.

Referring now to FIG. 9, at time $t_0$, the initiator electronic device 10 (e.g., processor core complex 18) may send the test signal via each sector, channel, or sub-channel to the responder device, as described above in block 70. At time $t_1$, the responder device (e.g., the processor of the responder device) may send signals (e.g., response signals) back to the initiator electronic device 10 in response to the test signals, as described above in block 74.

At time $t_2$, the electronic device 10 may determine the radio metric of the other co-existing radios for each sector, channel, or sub-channel, as described above in block 74. At time $t_3$, the responder device may similarly determine receiver quality data with respect to the test signals received via each sector, channel, or sub-channel. Although the swim lane diagram 110 depicts the initiator electronic device 10 determining its metrics prior to the responder device, it should be noted that the initiator electronic device 10 and the responder device may determine its respective metrics in any relative order. That is, the initiator electronic device 10 may determine its respective metrics of the other radios 30 before the responder device may determine its respective metrics, the responder device may determine its respective metrics before the initiator electronic device 10 may determine its respective metrics, or the initiator electronic device 10 and the responder device may determine their respective metrics at approximately the same time.

At time $t_4$, the responder device may send the receiver quality data, as described above in block 94, to the initiator electronic device 10. The initiator electronic device 10 may then, at time $t_5$, identify the sector to use for transmission based on the radio metrics of the other radios 32 and the receiver quality data of responder device, as described above in block 62.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising a radio frequency system configured to wirelessly transmit data, wherein the radio frequency system comprises:
 a plurality of radios configured to facilitate communication with one or more other electronic devices;
 a processor configured to:
  send a first command to a first radio of the plurality of radios to initiate an antenna sector level sweep;
  determine a first set of metrics associated with a first set of signals from one or more responder electronic devices, wherein the one or more responder electronic devices correspond to other radios of the plurality of radios that correspond to the antenna sector level sweep, wherein the first set of metrics comprises an indication of interference between at least two of the other radios in response to the first set of signals being transmitted;
  receive a second set of metrics associated with the first set of signals from the one or more responder electronic devices;
  identify a sector as an identified sector of a plurality of sectors associated with the antenna sector level sweep based on the first set of metrics and the second set of metrics; and
  send a second command to the first radio to transmit the data to the one or more other responder electronic devices via the identified sector of the plurality of sectors.

2. The electronic device of claim 1, wherein the first radio comprises a millimeter wave (MMW) radio.

3. The electronic device of claim 1, wherein the processor is configured to send the first command when a portion of the plurality of radios is active, wherein the portion of the plurality of radios excludes the first radio.

4. The electronic device of claim 1, wherein the plurality of radios is configured to communicate with one or more Wi-Fi devices, one or more global positioning system (GPS) system devices, one or more cellular devices, one or more Bluetooth devices, or any combination thereof.

5. The electronic device of claim 1, wherein the first set of metrics and the second set of metrics are indicative of a first plurality of received signal strengths of the other radios associated with the first set of signals transmitted by the first radio and a second plurality of received signal strengths received by the one or more responder electronic devices, respectively.

6. The electronic device of claim 1, wherein the first set of metrics and the second set of metrics comprise one or more Received Signal Strength Indicator (RSSI) values associated with the plurality of sectors of the antenna sector level sweep.

7. The electronic device of claim 1, comprising an antenna configured to transmit the first set of signals via the plurality of sectors to the one or more other electronic devices.

8. The electronic device of claim 1, wherein the second set of metrics is arranged in an array comprising each value of the second set of metrics and a corresponding sector of the plurality of sectors.

9. The electronic device of claim 1, wherein the processor is configured to identify the sector based on a highest combined relative metric value base on the first set of metrics and the second set of metrics.

10. A tangible, non-transitory, computer-readable medium configured to store instructions executable by one or more processors of a radio frequency system, wherein the instructions comprise instructions to cause the one or more processors to:
 determine a set of metrics associated with a set of signals received via a plurality of sectors of an antenna, wherein the set of signals is transmitted by an electronic device, wherein the set of metrics is indicative a strength of each signal of the set of signals received via the plurality of sectors, and wherein the strength of each signal of the set of signals is determined based on an interference associated with at least two radios of the electronic device in response to the set of signals being transmitted;
 transmit the set of metrics to an electronic device comprising a millimeter wave (MMW) radio; and
 receive data from the MMW radio via one of the plurality of sectors, wherein the one of the plurality of sectors is identified based on the set of metrics.

11. The computer-readable medium of claim 10, wherein the instructions to cause the processors to generate an array comprising the set of metrics, wherein the array is configured to organize the set of metrics with regard to each sector of the plurality of sectors.

12. The computer-readable medium of claim 11, wherein the set of signals is associated with an antenna sector level sweep being performed by the MMW radio.

13. The computer-readable medium of claim 11, wherein the set of metrics comprises a Received Signal Strength Indicator (RSSI) value associated with each signal of the set of signals received from each sector of the plurality of sectors.

14. The computer-readable medium of claim 10, wherein the set of metrics is indicative a strength of each signal of the set of signals received via a plurality of channels or a plurality of sub-channels.

15. A method for operating a first radio of a plurality of radios within a radio frequency system, comprising:
 sending, via one or more processors, a first command to the first radio of the plurality of radios to perform an antenna sector level sweep;
 determining, via the one or more processors, a first set of metrics of other radios of the plurality of radios associated with a first set of signals that correspond to the antenna sector level sweep, wherein the first set of metrics comprises an indication of interference between at least two of the other radios in response to the first set of signals being transmitted;
 receiving, via the one or more processors, a second set of metrics associated with the first set of signals from a communication station;
 identifying, via the one or more processors, a sector of a plurality of sectors, a channel of a plurality of channels, a sub-channel of a plurality of sub-channels, or any combination thereof associated with the antenna sector level sweep based on the first set of metrics and the second set of metrics; and
 sending, via the one or more processors, a second command to the first radio to transmit data to the communication station via the sector, the channel, the sub-channel, or any combination thereof.

16. The method of claim 15, comprising sending, via the one or more processors, the first command when a portion of the plurality of radios is active, wherein the portion of the plurality of radios excludes the first radio.

17. The method of claim 16, wherein the first radio comprises a millimeter wave (MMW) radio and the portion of the plurality of radios is configured to communicate with one or more Wi-Fi devices, one or more global positioning system (GPS) system devices, one or more cellular devices, one or more Bluetooth devices, or any combination thereof.

18. The method of claim 15, wherein the first set of metrics comprises one or more Received Signal Strength Indicator (RSSI) values associated with the plurality of sectors, the plurality of channels, the plurality of sub-channels, or any combination thereof.

19. The method of claim 16, wherein the second set of metrics is arranged in an array comprising each value of the second set of metrics and a corresponding sector of the plurality of sectors, a corresponding channel of the plurality of channels, a corresponding sub-channel of the plurality of sub-channels, or any combination thereof.

20. The method of claim 16, wherein the sector of a plurality of sectors, the channel of the plurality of channels, the sub-channel of the plurality of sub-channels, or any combination thereof is identified based on a highest combined relative metric value base on the first set of metrics and the second set of metrics.

21. The electronic device of claim 1, wherein the one or more responder electronic devices respectively comprise:
   an additional processor; and
   a tangible, non-transitory, computer-readable medium configured to store instructions executable by the additional processor, wherein the instructions comprise instructions to cause the additional processor to:
      determine the second set of metrics associated with the first set of signals received via a plurality of sectors of an antenna, wherein the second set of metrics is indicative of a strength of each signal of the first set of signals received via the plurality of sectors;
      transmit the second set of metrics to the processor; and
   receive data from the first radio via one of the plurality of sectors, wherein the one of the plurality of sectors is identified based on the second set of metrics.

* * * * *